(12) United States Patent
Chiang et al.

(10) Patent No.: US 9,639,118 B2
(45) Date of Patent: May 2, 2017

(54) HOUSING, ELECTRONIC DEVICE USING SAME AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Chwan-Hwa Chiang, New Taipei (TW); Chieh-Hsiang Wang, New Taipei (TW); Bao-Shen Zhang, Shenzhen (CN); Chen-Yi Tai, New Taipei (TW)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 76 days.

(21) Appl. No.: 14/826,680

(22) Filed: Aug. 14, 2015

(65) Prior Publication Data

US 2016/0327981 A1   Nov. 10, 2016

(30) Foreign Application Priority Data

May 8, 2015   (CN) .......................... 2015 1 0231373

(51) Int. Cl.
*G06F 1/16* (2006.01)
*A45C 11/00* (2006.01)

(52) U.S. Cl.
CPC ............ *G06F 1/1626* (2013.01); *A45C 11/00* (2013.01); *G06F 1/1656* (2013.01); *A45C 2011/002* (2013.01)

(58) Field of Classification Search
CPC ............................. G06F 1/1626; G06F 1/1656
See application file for complete search history.

(56) References Cited

U.S. PATENT DOCUMENTS

| | | | | |
|---|---|---|---|---|
| 7,554,177 B2* | 6/2009 | Geefay | ............... | B81C 1/00269 257/622 |
| 8,913,395 B2* | 12/2014 | Myers | ................... | G06F 1/1626 174/377 |
| 9,357,665 B2* | 5/2016 | Myers | ................... | G06F 1/1626 |
| 2009/0017263 A1* | 1/2009 | Yeates | .................... | B22D 19/04 428/167 |
| 2015/0122540 A1* | 5/2015 | Myers | .................. | G06F 1/1626 174/520 |
| 2016/0187925 A1* | 6/2016 | Yang | ..................... | G06F 1/1626 361/679.56 |
| 2016/0192517 A1* | 6/2016 | Tsao | ..................... | H04B 1/3888 361/679.01 |

* cited by examiner

*Primary Examiner* — Anthony Q Edwards
(74) *Attorney, Agent, or Firm* — Steven Reiss

(57) ABSTRACT

A housing includes a main portion and at least one insulating portion. The main portion includes two portions, an inner surface and an outer surface opposite to the inner surface. The inner surface defines at least one groove. The outer surface defines at least one gap that is coupled to the at least one groove. The at least one insulating portion is corresponding to the at least one groove and each insulating portion is filled in one groove. The two portions of the main portion are positioned at two sides of the at least one gap and the two portions are insulated by the at least one gap and the at least one insulating portion.

20 Claims, 7 Drawing Sheets

HOUSING, ELECTRONIC DEVICE USING SAME AND METHOD FOR MAKING SAME

CROSS-REFERENCE TO RELATED APPLICATIONS

This application claims priority to Chinese Patent Application No. 201510231373.4 filed on May 8, 2015, the contents of which are incorporated by reference herein.

FIELD

The subject matter herein generally relates to a housing for electronic devices and a method for making the housing.

BACKGROUND

Metal housings are widely used for electronic devices, such as mobile phones or personal digital assistants (PDAs). Antennas are also important components in the electronic devices. Locations of the metal housing corresponding to the antenna often define at least one groove, and the at least one groove is filled with an insulating component via injection molding. The grooves of the metal housing often have different colors.

BRIEF DESCRIPTION OF THE DRAWINGS

Implementations of the present technology will now be described, by way of example only, with reference to the attached figures.

DETAILED DESCRIPTION

Figure 1:
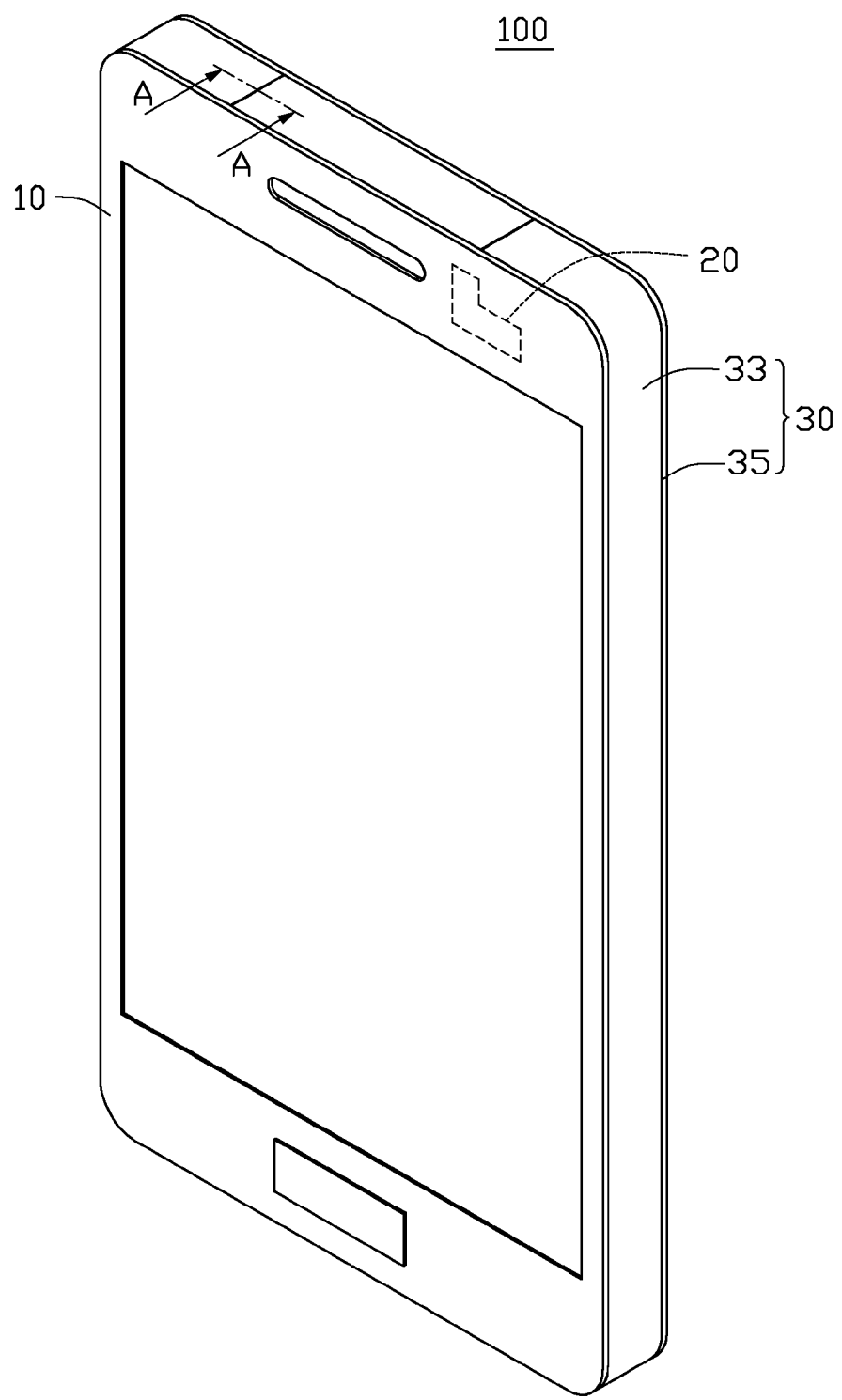
FIG. 1 is an isometric view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an embodiment of an electronic device 100. The electronic device 100 may be, but not limited to, a mobile phone, a personal digital assistant (PDA), or a tablet computer. In at least one embodiment, the electronic device 100 is a mobile phone. The electronic device 100 includes a display screen 10, an antenna module 20, and a housing 30. The display screen 10 is embedded into the housing 30. Light transmitted from a display unit (not shown) under the display screen 10 may pass through the display screen 10 and be viewed by users. The display screen 10 and the housing 30 cooperatively form an accommodating space for receiving the antenna module 20 and other electronic components, such as, a battery and/or a printed circuit board.

In at least one embodiment, the housing 30 includes a first housing 33 and a second housing 35. The first housing 33 can be a middle frame of the electronic device 100. The second housing 35 may be a battery cover of the electronic device 100. The second housing 35 can be detachably assembled to the first housing 33 via a latching structure or the like. In other embodiments, the second housing 35 can also be omitted.

Figure 2:
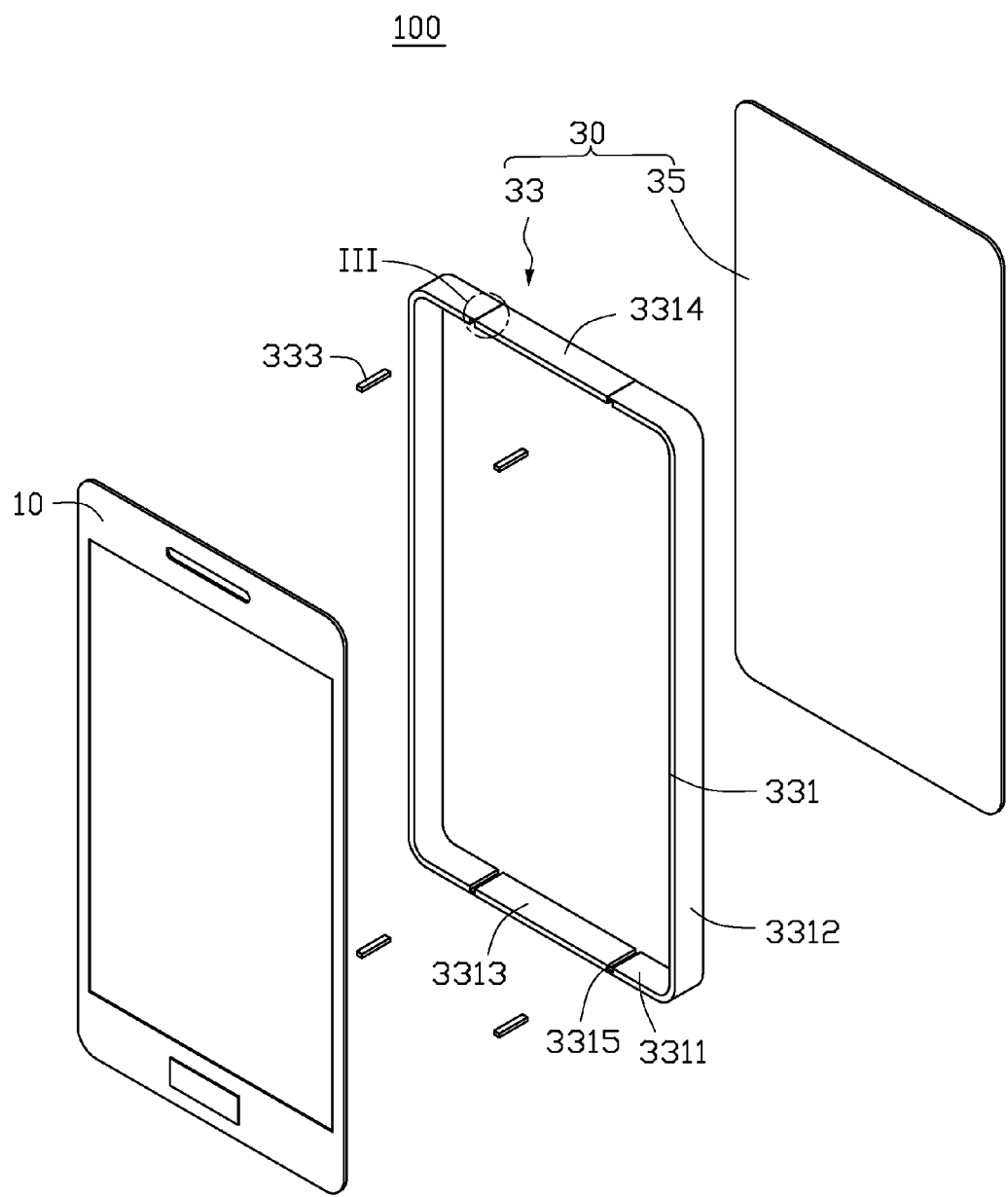
FIG. 2 is an exploded, isometric view of the electronic device of FIG. 1.

FIG. 2 illustrates that the first housing 33 includes a main portion 331 and at least one insulating portion 333. The main portion 331 is substantially a cuboid shape closed frame. The main portion 331 can be made of metal which can be selected from a group consisting of aluminum, aluminum alloy, magnesium, magnesium alloy, titanium, titanium alloy, stainless steel, and any combination thereof. In at least one embodiment, the main portion 331 is made of aluminum alloy. The main portion 331 has a thickness of about 1 mm to 2 mm.

The main portion 331 includes two opposite first end walls 3311 and two opposite second end walls 3312. In at least one embodiment, the two first end walls 3311 are parallel to each other. The two second end walls 3312 are parallel to each other and are perpendicularly connected to the two first end walls 3311, thereby cooperatively forming the closed frame.

In at least one embodiment, each first end wall 3311 includes an inner surface 3313 and an outer surface 3314 opposite to the inner surface 3313. Each first end wall 3311 defines at least one groove 3315. Each insulating portion 333 is received in one groove 3315 by injection molding. In at least one embodiment, each inner surface 3313 of the first end walls 3311 defines two grooves 3315, and each groove 3315 has a depth of about 2 mm to about 4 mm. The locations of the grooves 3315 on the main portion 331 can be adjusted according to a need of the housing 30. For example, the grooves 3315 can also be defined on the second end walls 3312.

Figure 3:
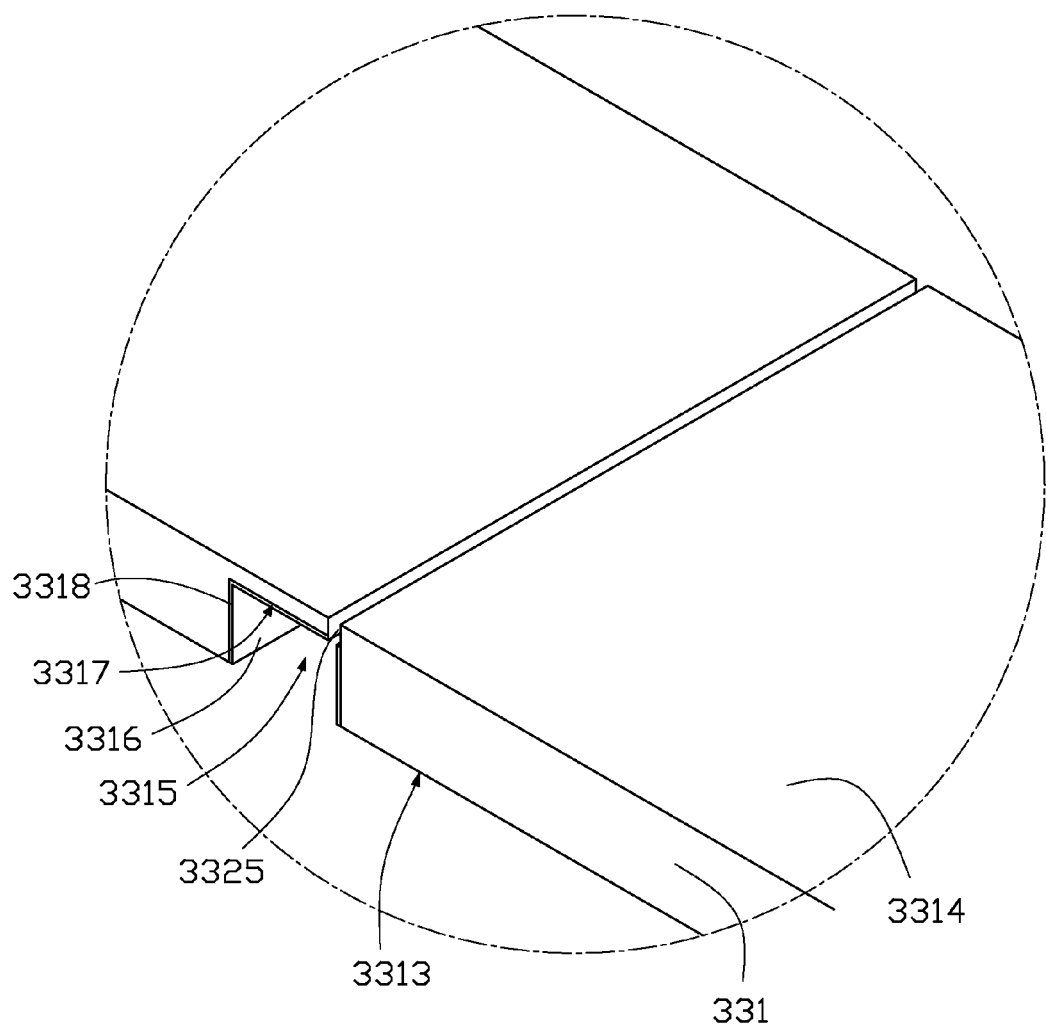
FIG. 3 is an enlarged view of portion III of FIG. 2.

FIG. 3 illustrates that each groove 3315 includes two sidewalls 3316 and a bottom wall 3317 perpendicularly connected between the two sidewalls 3316. The bottom wall 3317 is parallel to the inner surface 3313 and/or the outer surface 3314 of the first end wall 3311. In at least one embodiment, the groove 3315 is substantially rectangular. A shape of each groove 3315 can also be adjusted according to the need of the housing 30.

A metallic layer 3318 is formed on the sidewalls 3316 and the bottom wall 3317 through electroplating process or the like. The metallic layer 3318 can be made of metal which can be selected from a group consisting of gold, silver, copper, nickel, zinc, tin, aluminum, chromium, and any combination thereof. In this embodiment, the metallic layer 3318 is made of nickel.

Figure 4:
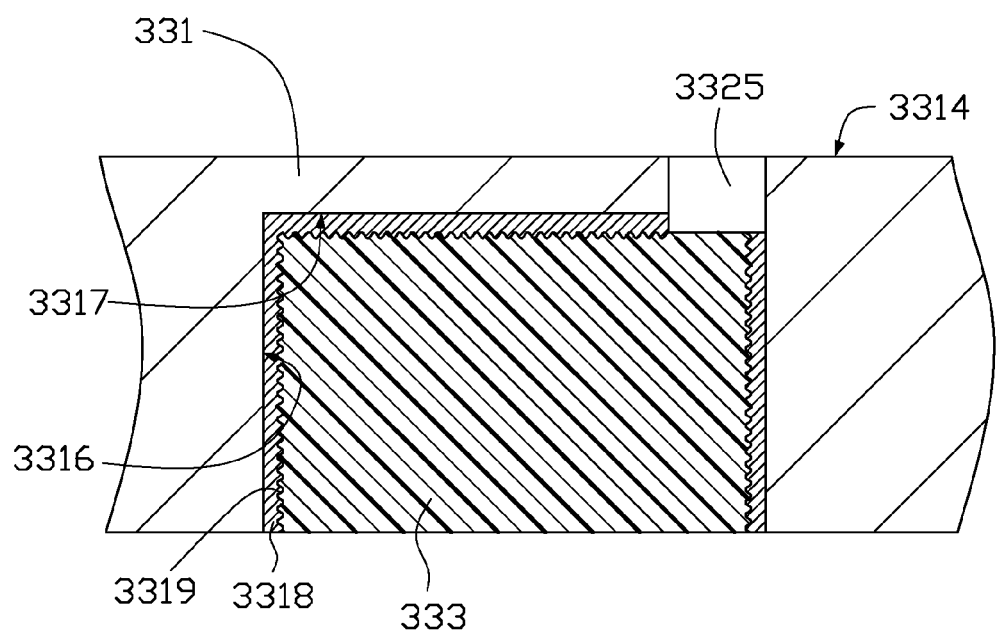
FIG. 4 is a cross-sectional view taken along line A-A of FIG. 1, according to a first exemplary embodiment.

FIG. 4 illustrates that a surface of the metallic layer 3318 further defines at least one pore 3319. In at least one embodiment, a pore size of each pore 3319 is less than 100 μm, and preferably, the pore size of each pore 3319 is about 1 μm to about 50 μm. The insulating portion 333 can fill the groove 3315 and cover a surface of the metallic layer 3318, such that the insulating portion 333 can be positioned in the groove 3315. In addition, one portion of the insulating portion 333 can be engaged in the pore 3319 of the metallic layer 3318, such that the insulating portion 333 can be strongly bond with the main portion 331. The insulating portion 333 may be molded from a thermoplastic material, such as polyphenylene sulfide (PPS), Polycarbonate (PC), acrylonitrile butadiene styrene (ABS), polybutylece terephthalate (PBT), Polymethyl Methacrylate (PMMA), Polyamide (PA), and their modified materials, for example, a composition material with polycarbonate and glass fiber.

At least one gap 3325 is formed on each first end wall 3311. In this embodiment, the gap 3325 is formed from the outer surface 3314 of the first end wall 3311 to a junction between the metallic layer 3318 and the insulating portion 333. Then, the first end wall 3311 and the metallic layer 3318 can be effectively insulated by the gap 3325 and the insulating portion 333, that is, the first end walls 3311 positioned at two sides of the gap 3325 are coupled to each other via the insulting portion 333, thereby preventing the main portion 331 from effecting a signal transmission of the antenna module 20.

In at least one embodiment, each groove 3315 defines one gap 3325. The gap 3325 has a width of about 10 μm to about 100 μm. A depth of the gap 3325 from the outer surface 3314 of the first end wall 3311 to the inner surface 3313 is about 10 μm to about 50 μm. In at least one embodiment, each gap 3325 is defined at one side of the groove 3315, for example, a junction between the bottom wall 3317 and one sidewall 3316. The gaps 3325 defined on the two first end walls 3311 are also symmetric with each other, thereby obtaining a better appearance.

In other embodiments, the first housing 33 can further includes a decorating layer (not shown). The decorating layer is formed on the outer surface 3314 of the main portion 331 and is configured to provide a metallic appearance for the housing 30. In one embodiment, the decorating layer has a thickness of about 10 μm to about 30 μm.

Figure 5:
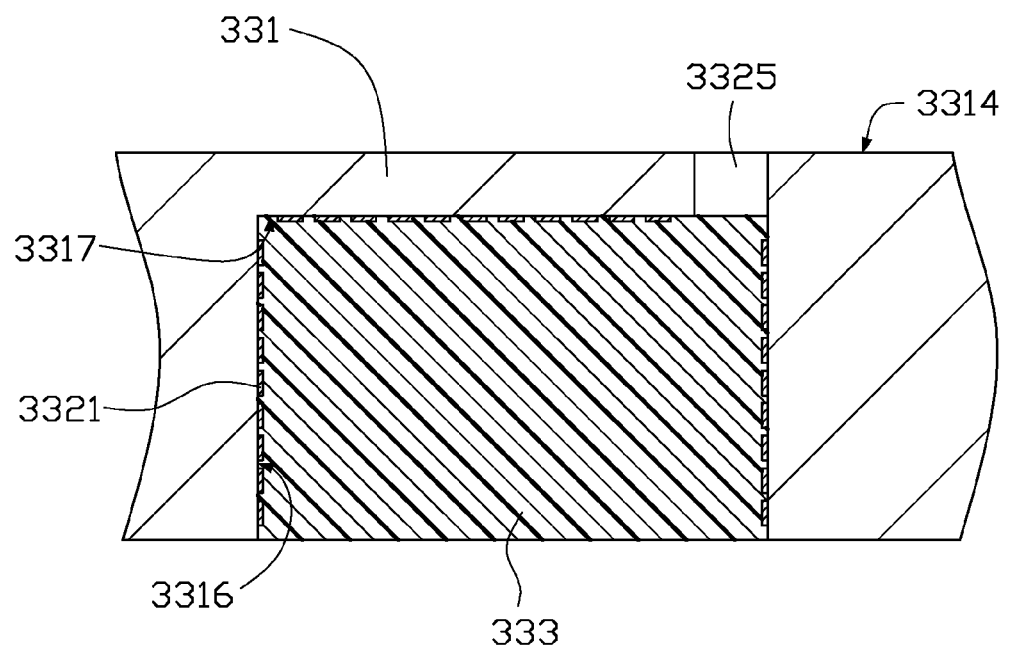
FIG. 5 is a cross-sectional view taken along line A-A of FIG. 1, according to a second exemplary embodiment.

FIG. 5 illustrates a second embodiment of the electronic device 100 which differs from the first embodiment of the electronic device 100 in that the metallic layer 3318 is replaced by a plurality of metallic posts 3321. The plurality of metallic posts 3321 protrudes on the sidewalls 3316 and the bottom wall 3317. The plurality of metallic posts 3321 is spaced apart from each other. The insulating portion 333 can fill the groove 3315 and one portion of the insulating portion 333 can be engaged in two adjacent metallic posts 3321, thereby enhancing bonding strength between the insulating portion 333 and a surface of the groove 3315. In at least one embodiment, each metallic post 3321 has a diameter of about 0.01 mm to about 0.1 mm, and a height of about 2 μm to about 15 μm. It can be understood that the plurality of metallic posts 3321 may has different diameters or/and heights, which can enhance a bonding force between the insulating portion 333 and the surface of the groove 3315.

In other embodiments, the surface of the plurality of metallic posts 3321 may have a lower glossiness or flatness, thereby forming an atomization effect. The metallic posts 3321 having the atomization effect may have a height of about 2 μm to about 20 μm, a diameter of about 0.01 mm to about 0.1 mm, and a surface roughness (Ra) of about 2 μm to about 5 μm.

Figure 6:
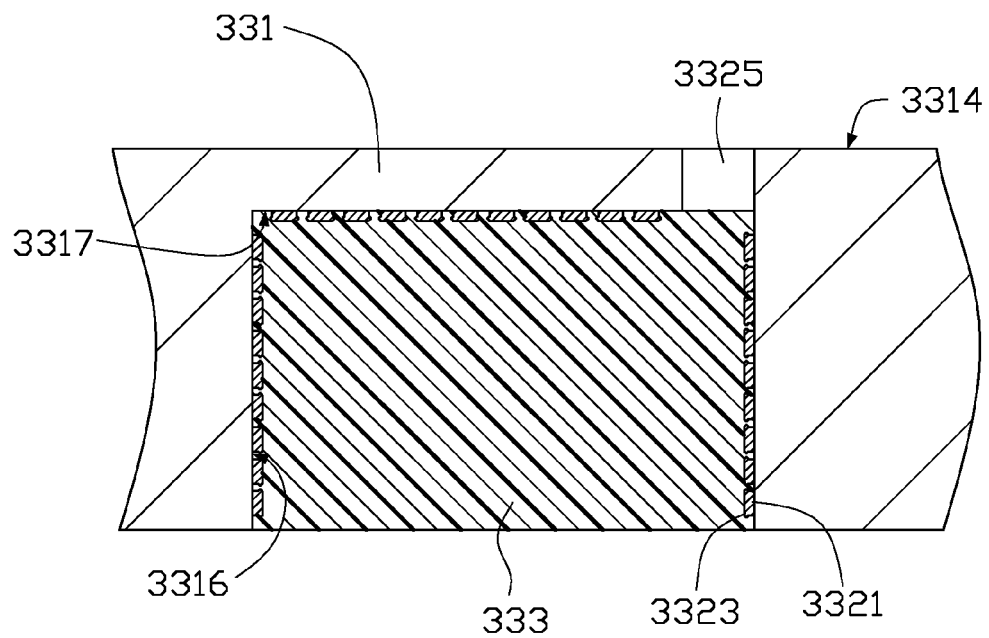
FIG. 6 is a cross-sectional view taken along line A-A of FIG. 1, according to a third exemplary embodiment.

FIG. 6 illustrates a third embodiment of the electronic device 100 which differs from the second embodiment of the electronic device 100 in that one end of each metallic post 3321 away from the sidewall 3316 or the bottom wall 3317 further protrudes a metallic block 3323. The plurality of metallic blocks 3323 is spaced apart with each other and is configured to enhance a bonding force between the insulating portion 333 and the surface of the groove 3315.

In at least one embodiment, a thickness of each metallic block 3323 is about 4 μm to about 8 μm. In other embodiments, the surface of the plurality of metallic posts 3321 and the metallic blocks 3323 may have a lower glossiness or flatness, thereby forming a mist effect. The metallic blocks 3323 having the mist effect may have a height of about 4 μm to about 8 μm, and a surface roughness (Ra) of about 2 μm to about 5 μm.

Figure 7:
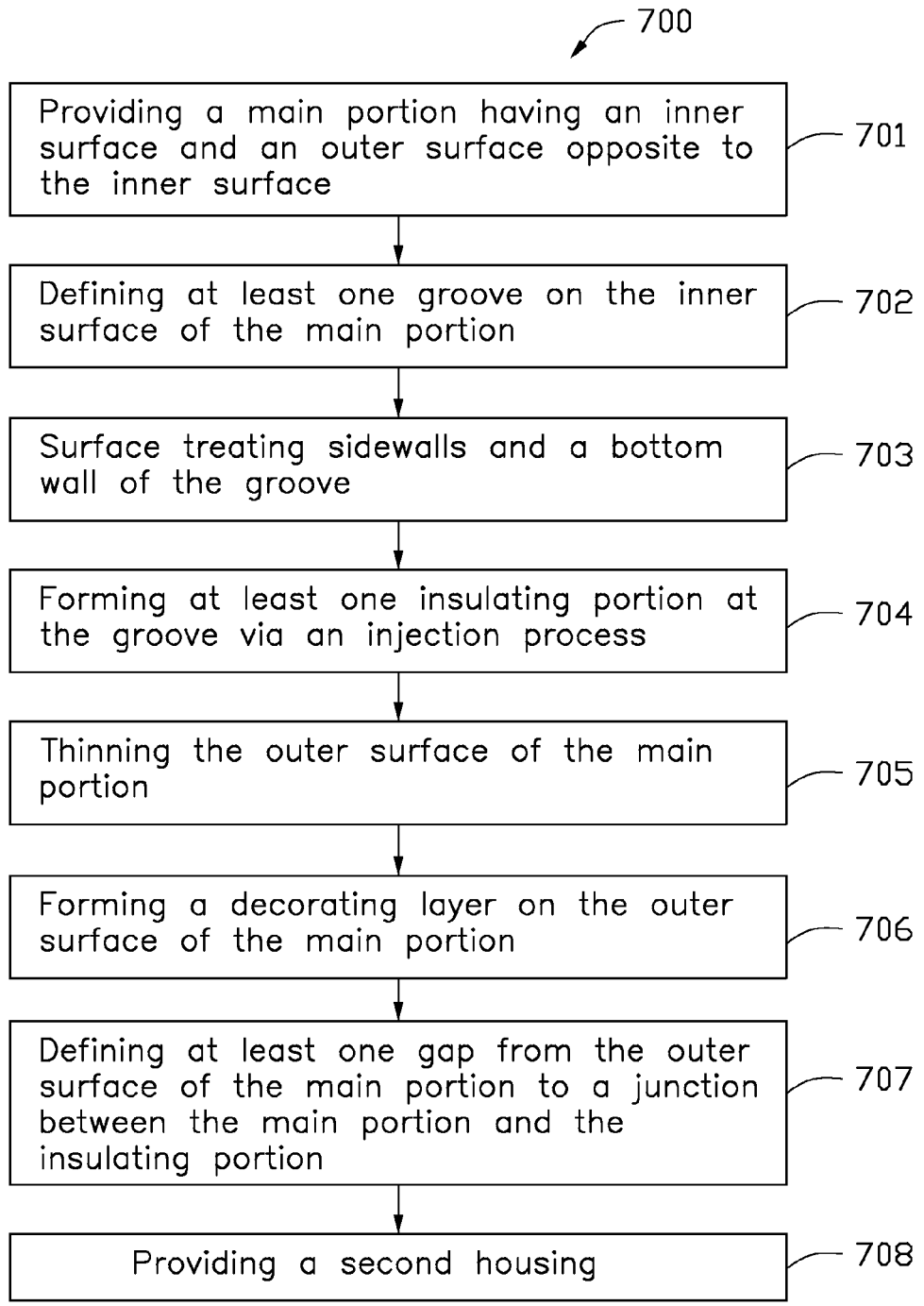
FIG. 7 is a flow chart of a method for making a housing in accordance with an exemplary embodiment.

Referring to FIG. 7, a flowchart is presented in accordance with an example embodiment. The method 700 is provided by way of example, as there are a variety of ways to carry out the method. The method 700 described below can be carried out using the configurations illustrated in FIGS. 1-6, for example, and various elements of these figures are referenced in explaining example method 700. Each block shown in FIG. 7 represents one or more processes, methods or subroutines, carried out in the example method 700. Furthermore, the order of blocks is illustrative only and the order of the blocks can change according to the present disclosure. Additional blocks can be added or fewer blocks can be utilized, without departing from this disclosure. The method 700 for making the housing 30 can begin at block 701.

At block 701, a main portion 331 is provided. The main portion 331 may be a closed frame. In at least one embodiment, the main portion 331 is substantially rectangular and is made of aluminum alloy. The main portion 331 has a thickness of about 4 mm to about 5 mm. The main portion 331 includes two opposite first end walls 3311 and two opposite second end walls 3312. In at least one embodiment, the first end walls 3311 are parallel to each other. The two second end walls 3312 are parallel to each other and are perpendicularly connected to the two first end walls 3311, thereby cooperatively forming the closed frame. Each first end wall 3311 includes an inner surface 3313 and an outer surface 3314 opposite to the inner surface 3313.

At block 702, at least one groove 3315 is formed on an inner surface 3313 of the first end wall 3311. In this embodiment, each inner surface 3313 of the first end walls 3311 defines two grooves 3315. It can be understood that the grooves 3315 can be also defined on the second end walls 3312. Each groove 3315 includes two sidewalls 3316 and a bottom wall 3317 connecting between the two sidewalls 3316.

At block 703, the sidewalls 3316 and the bottom wall 3317 are surface treated. In a first embodiment, the sidewalls 3316 and the bottom wall 3317 of the groove 3315 can be electroplating process to form a metallic layer 3318 on the sidewalls 3316 and the bottom wall 3317. A surface of the metallic layer 3318 defines at least one pore 3319. In at least one embodiment, a pore size of each pore 3319 is less than 100 um, and preferably, the pore size of each pore 3319 is about 1 µm to about 50 µm.

In a second embodiment, the sidewalls 3316 and the bottom wall 3317 of the groove 3315 can be electroplating process or electrochemical plating process to form a plurality of metallic posts 3321 on the sidewalls 3316 and the bottom wall 3317. The groove 3315 can be firstly shielding process to form a shielding layer. The shielding layer can be laser engraved process to form a plurality of holes. The main portion 331 is further surface treated to form the plurality of metallic posts 3321. The metallic posts 3321 are filled in the plurality of holes of the shielding layer. In addition, the main portion 331 is surface treated for clearing the shielding layer on the surface of the main portion 331.

In a third embodiment, the metallic posts 3321 are firstly formed as the second embodiment, and one end of each metallic post 3321 away from the sidewall 3316 or the bottom wall 3317 further protrudes a metallic block 3323.

At block 704, the insulating portion 333 is formed at the groove 3315. In detail, the insulating portions 333 can be formed by an injection process. The insulating portion 333 may be molded from a thermoplastic material, such as polyphenylene sulfide (PPS), Polycarbonate (PC), acrylonitrile butadiene styrene (ABS), polybutylece terephthalate (PBT), Polymethyl Methacrylate (PMMA), Polyamide (PA), and their modified materials, such as a composition material with polycarbonate and glass fiber. The insulating portion 333 fills the groove 3315 and one portion of the insulating portion 333 can be engaged in the pore 3319 of the metallic layer 3318 or can be engaged in two adjacent metallic posts 3321, thereby enhancing bonding strength between the insulating portion 333 and the groove 3315.

At block 705, one end of the main portion 331 closer to the outer surface 3314 is thinned. In detail, one end of the main portion 331 closer to the outer surface 3314 is thinned by controlling computer numerical control (CNC) manner, thereby a thickness from the bottom wall 3317 to the outer surface 3314 is thinned to be about 10 µm to 50 µm, and a thickness of other area of the main portion 331 is about 1 mm to 2 mm.

At block 706, the outer surface 3314 of the main portion 331 can be surface treated, such as anodizing process to form a decorating layer. In at least one embodiment, the decorating layer is an oxide layer. The decorating layer is configured to provide a metallic appearance for the housing 30. In one embodiment, the decorating layer has a thickness of about 10 µm to about 30 µm.

At block 707, at least one gap 3325 is formed on each first end wall 3311. The gap 3325 is formed from the outer surface 3314 of the first end wall 3311 to a junction between the metallic layer 3318 and the insulating portion 333. Then, the first end wall 3311 and the metallic layer 3318 can be effectively insulated by the gap 3325 and the insulating portion 333, that is, the first end walls 3311 positioned at two sides of the gap 3325 are coupled to each other via the insulting portion 333, thereby preventing the main portion 331 from effecting a signal transmission of the antenna module 20.

In at least one embodiment, each groove 3315 defines one gap 3325 and the gap 3325 has a width of about 10 µm to about 100 µm. A depth of the gap 3325 from the outer surface 3314 of the first end wall 3311 to the inner surface 3313 is about 10 µm to about 50 µm. In at least one embodiment, each gap 3325 is defined at one side of the groove 3315, that is, a junction between the bottom wall 3317 and one sidewall 3316. The gaps 3325 defined on the two first end walls 3311 are also symmetric with each other, thereby obtaining a better appearance.

At block 708, a second housing 35 is provided and can be detachably assembled to the first housing 33 through a latching structure or the like.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A housing comprising:
a main portion comprising two portions, an inner surface defining at least one groove, and an outer surface opposite to the inner surface, the outer surface defining at least one gap that is coupled to the at least one groove; and
at least one insulating portion corresponding to the at least one groove, each insulating portion filled in one groove;
wherein the two portions of the main portion are positioned at two sides of the at least one gap and the two portions are insulated by the at least one gap and the at least one insulating portion.

2. The housing of claim 1, wherein the main portion comprises two opposite first end walls and two opposite second end walls, the at least one groove is defined on the two first end walls or the two second end walls.

3. The housing of claim 1, wherein each gap has a width of about 10 µm to about 100 µm, and a depth of the gap from the outer surface of the main portion to the inner surface is about 10 µm to about 50 µm.

4. The housing of claim 1, wherein each groove comprises two sidewalls and a bottom wall perpendicularly connected between the two sidewalls, the gap is defined at a junction between the bottom wall and one sidewall.

5. The housing of claim 4, wherein a metallic layer is formed on the sidewalls and the bottom wall, a surface of the metallic layer further defines at least one pore, the insulating portion is filled in the groove and one portion of the insulating portion is engaged in the at least one pore.

6. The housing of claim 4, wherein a plurality of metallic posts protrudes on the sidewalls and the bottom wall, the plurality of metallic posts is spaced apart with each other, the insulating portion is filled the groove and one portion of the insulating portion is engaged in two adjacent metallic posts.

7. The housing of claim 6, wherein one end of each metallic post away from the sidewalls or the bottom wall protrudes a metallic block, the plurality of metallic blocks is spaced apart with each other and is configured to enhance a bonding force between the insulating portion and the surface of the groove.

8. An electronic device comprising:
a display screen; and
a housing assembled to the display screen, the housing comprising:
a main portion comprising two portions, an inner surface defining at least one groove, and an outer surface opposite to the inner surface, the outer surface defining at least one gap that is coupled to the at least one groove; and at least one insulating portion corresponding to the at least one groove, each insulating portion filled in one groove;

wherein the two portions of the main portion are positioned at two sides of the at least one gap and the two portions are insulated by the at least one gap and the at least one insulating portion.

9. The electronic device of claim 8, wherein the main portion comprises two opposite first end walls and two opposite second end walls, the at least one groove is defined on the two first end walls or the two second end walls.

10. The electronic device of claim 8, wherein each gap has a width of about 10 μm to about 100 μm, and a depth of the gap from the outer surface of the main portion to the inner surface is about 10 μm to about 50 μm.

11. The electronic device of claim 8, wherein a decorating layer is further formed on the outer surface of the main portion and is configured to provide a metallic appearance for the housing.

12. The electronic device of claim 8, wherein the groove comprises two sidewalls and a bottom wall perpendicularly connected between the two sidewalls, the gap is defined at a junction between the bottom wall and one sidewall.

13. The electronic device of claim 12, wherein a metallic layer is formed on the sidewalls and the bottom wall, a surface of the metallic layer further defines at least one pore, the insulating portion is filled in the groove and one portion of the insulating portion is engaged in the at least one pore.

14. The electronic device of claim 12, wherein a plurality of metallic posts protrudes on the sidewalls and the bottom wall, the plurality of metallic posts is spaced apart with each other, the insulating portion is filled the groove and one portion of the insulating portion is engaged in two adjacent metallic posts.

15. The electronic device of claim 14, wherein one end of each metallic post away from the sidewalls or the bottom wall protrudes a metallic block, the plurality of metallic blocks is spaced apart with each other and is configured to enhance a bonding force between the insulating portion and the surface of the groove.

16. A method of making a housing comprising:

providing a main portion having an inner surface and an outer surface opposite to the inner surface;

defining at least one groove on the inner surface of the main portion;

forming at least one insulating portion at the groove via an injection process;

thinning the outer surface of the main portion;

defining at least one gap from the outer surface of the main portion to a junction between the main portion and the insulating portion.

17. The method of claim 16, wherein a thickness of the main portion is about 4 mm to about 5 mm, and the thickness of the main portion is thinned to be about 1 mm to about 2 mm.

18. The method of claim 16, before the step of forming at least one insulating portion at the groove via an injection process, the method further comprises:

forming a metallic layer on a surface of the groove; and defining at least one pore on the metallic layer.

19. The method of claim 16, before the step of forming at least one insulating portion at the groove via an injection process, the method further comprises:

forming a shielding layer on a surface of the groove;

forming a plurality of holes on the shielding layer via laser engraved process;

forming a plurality of metallic posts filled in the plurality of holes of the shielding layer; and clearing the shielding layer on the surface of the main portion.

20. The method of claim 19, further comprises:

forming a metallic block on one end of each metallic post away from the surface of the groove.

\* \* \* \* \*